United States Patent
Baig et al.

(10) Patent No.: US 6,645,380 B2
(45) Date of Patent: Nov. 11, 2003

(54) MEMBRANE SEPARATION APPARATUS

(75) Inventors: Fakhir U. Baig, Oakville (CA); Abdul M. Kazi, Oakville (CA); Aiser Al-Hassani, Mississauga (CA)

(73) Assignee: Petro Sep International Ltd., Geneva (CH)

( * ) Notice: Subject to any disclaimer, the term of this patent is extended or adjusted under 35 U.S.C. 154(b) by 0 days.

(21) Appl. No.: 10/020,883

(22) Filed: Dec. 19, 2001

(65) Prior Publication Data

US 2003/0111402 A1 Jun. 19, 2003

(51) Int. Cl.[7] .............................................. B01D 28/12
(52) U.S. Cl. .............................. 210/321.6; 210/321.75; 210/321.84; 210/640; 210/180; 210/231; 210/340; 55/158
(58) Field of Search ................................. 210/180, 184, 210/321.6, 321.75, 321.84, 228, 640, 340, 231; 55/158

(56) References Cited

U.S. PATENT DOCUMENTS

| | | | |
|---|---|---|---|
| 4,295,766 A | * 10/1981 | Shaw | 411/113 |
| 4,316,774 A | * 2/1982 | Trusch | 203/11 |
| 4,650,574 A | 3/1987 | Hilgendorff et al. | |
| 4,769,140 A | 9/1988 | van Dijk et al. | |
| 5,034,125 A | * 7/1991 | Karbachsch et al. | 210/321.8 |
| 5,437,796 A | 8/1995 | Bruschke et al. | |
| 5,868,930 A | * 2/1999 | Kopf | 210/321.75 |
| 6,227,696 B1 | * 5/2001 | Duchnowski et al. | 366/174.1 |

* cited by examiner

Primary Examiner—Joseph Drodge
Assistant Examiner—Krishnan S Menon
(74) Attorney, Agent, or Firm—Patrick J. Hofbauer

(57) ABSTRACT

An apparatus for the separation of fluid mixtures into a permeate and a retentate comprises separation modules each having fluid containment chambers stacked therein. Each fluid containment chamber is defined by a pair of selectively permeable membranes having their active surfaces facing inwardly toward one another, with a gasket sandwiched therebetween in sealing engagement with each membrane. A channelled support plate is positioned adjacent to the outside surface of each membrane. The channels in the support plates fluidly communicate with a housing, thereby allowing negative pressure from the housing to be brought into direct contact with the outside surface of each selectively permeable membrane. The fluid mixture is pumped into each fluid containment chamber at one end and moves across the active surfaces of the membranes toward a retentate receiver positioned at the opposite end. In doing so, permeate is drawn out through both membranes into the channels and the housing. The housing has a top panel which is adjustable to ensure ongoing sealing engagement of the gaskets with the membranes.

22 Claims, 9 Drawing Sheets

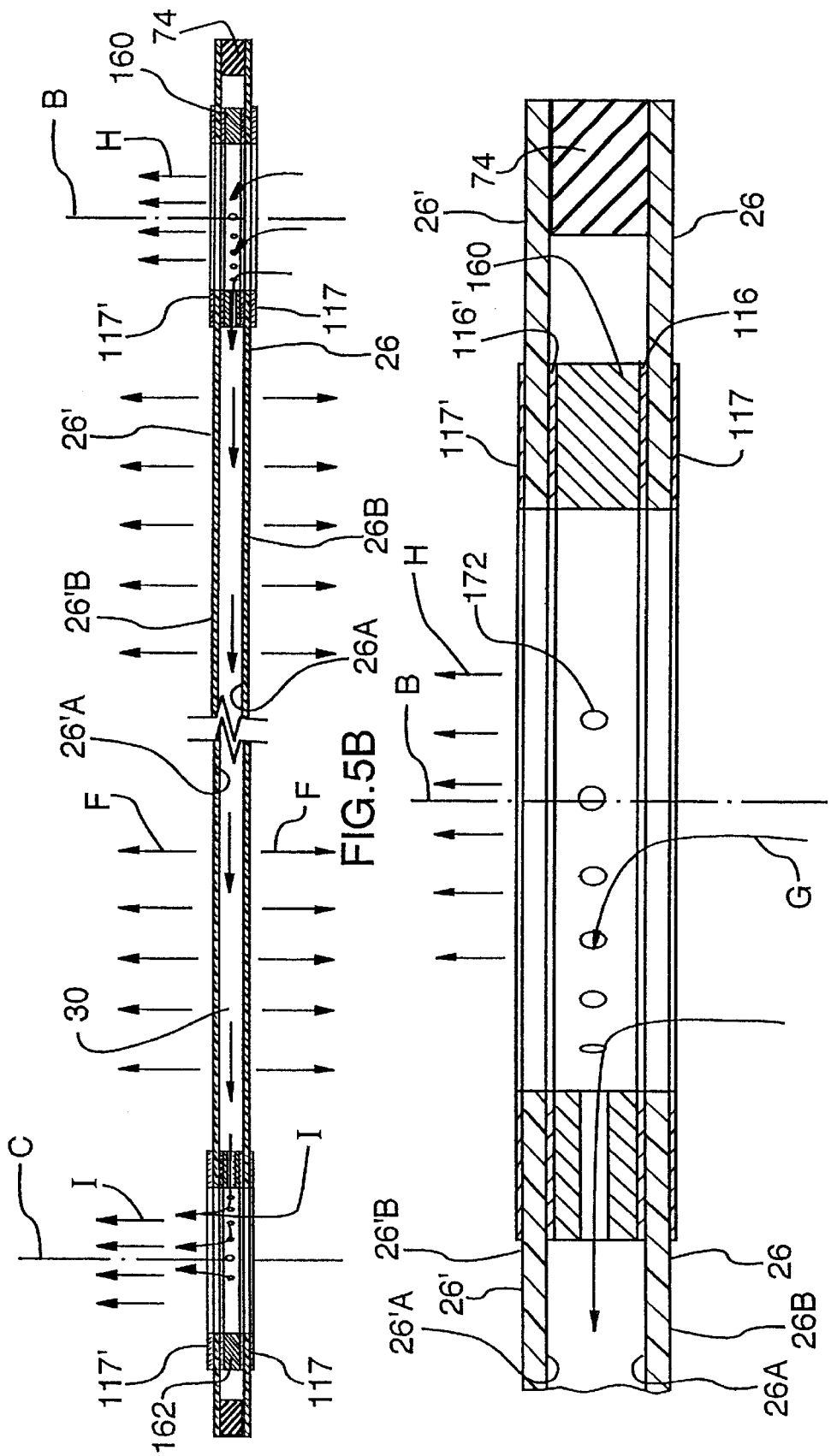

MEMBRANE SEPARATION APPARATUS

FIELD OF THE INVENTION

The present invention relates to a membrane separation apparatus and to its use for the separation of fluid mixtures by, for example, pervaporation, vapor permeation and vacuum membrane distillation.

BACKGROUND OF THE INVENTION

Pervaporation, vapor permeation, and vacuum membrane distillation (VMD), are all well known processes for separating fluid mixtures. In all of these three separation processes, an initial feed stream is separated into two streams: i) the retentate stream, which is rich in non-permeating components; and ii) the permeate stream, which is rich in the components which are able to pass through a selectively permeable membrane used in the separating process.

In pervaporation, the membrane acts as a selective barrier between the initial feed in liquid phase and the permeate in vapor phase. Thus, the membrane only allows the desired component(s) of the initial feed stream to transfer through the membrane by vaporization. The separation process is governed by the chemical affinity of the separating component(s) and the membrane, and not by the volatility difference of the separating components or the vapor liquid equilibrium. The driving force for the transfer of the permeating components(s) of the initial mixture is the partial pressure gradient of the selective or better permeating component(s) of the mixture across the membrane. Vapor permeation utilizes the same type of membrane. The only difference is that the initial feed stream, instead of being in the liquid phase as with pervaporation, is in contact with the membrane in the vapor phase.

Liquid mixtures with components having different volatilities and marked different boiling points are usually separated by distillation. However, in many cases during distillation, commonly used solvents, including aqueous mixtures, such as ethanol-water, isopropanol-water, etc. reach a limit point at which the concentration of the components in the vapor phases is similar to the concentration of the components in the liquid phase. This point is called the azeotropic point. Beyond the azeotropic point, simple distillation cannot perform any further separation. This problem is traditionally overcome by the addition of a third compound (solvent) that selectively associates with the more polar key components in the initial feed mixture, and can significantly increase the relative volatility of close-boiling-point components, thus making further separation by distillation beyond the azeotropic point technically possible. Although this method is widely used in industry, it suffers the drawback of contaminating the products by the third component, which can be especially detrimental in food or pharmaceutical applications.

Pervaporation and vapor permeation each offer an alternative solution to distillation in this regard. In these two processes, membranes are exposed to the initial mixed feed stream on one side of the membrane, and a vacuum is applied on the opposite other side thereof. One of the components of the initial feed stream is preferably absorbed by the membrane and diffuses through the membrane to be removed as vapor from the other side. The component of the initial feed stream that passes through the membrane is called the permeate. Since the separation is not dependent on the vapor liquid equilibrium, a proper selection of the membrane will allow separation of fluid mixtures both below and above the azeotropic point.

The VMD process is very similar to pervaporation. The main difference with pervaporation is that the membranes used therein, through which one (or more) of the components diffuse, are non-porous. In contrast, in VMD, separation takes place by evaporation through porous hydrophobic (water repellant) membranes. The hydrophobic nature of the membrane prevents the flow of water through its pores. As long as pressure on the vacuum side is maintained below the minimum required for liquid to penetrate the pores, a liquid-vapor interface exists at the pores of the membrane. Separation is thus governed by the vapor-liquid equilibrium.

Due to the porous nature of the membrane used in VMD, the permeate flux is significantly higher than achieved by pervaporation membranes Accordingly, VMD is particularly useful where the volatility of the components to be separated is quite different: eg. the removal of volatile organic compounds from water; evaporating liquid from a salt solution, for example, desalination of sea or brackish water for making ultra-pure water.

The flat sheet membranes used in all of the three processes discussed above can be housed in a module having the same general design. These modules should have reliable sealing between the feed side of the module and the permeate side of the module. They must also have high resistance to harsh operating conditions. To make these separation processes economically feasible, these modules should house a significantly large membrane surface area.

One way of reduction in overall size of the separation device is by the utilization of plate and frame type modules, each housing a plurality of membrane layers stacked with respect to one another in close parallel relation, and operatively connected for exposure to the fluid feed mixture to be separated. An example of such a prior art device is described in U.S. Pat. Nos. 5,437,796 (Bruschke et al.) and 4,769,140 (van Dijk et al.), which patents teach a plurality of feed plates, gaskets and membranes stacked upon one another.

However, the plate and frame module of Bruschke et al. and van Dijk et al. suffer from undue complexity of design utilizing a very large number of layers of components for securing and sealing the membranes, resulting in unduly high costs of production, installation and maintenance.

A further drawback of the separation devices of the prior art is the general way in which their membrane separation modules are housed for applying a vacuum thereacross. The known practice is to arrange the plurality of membrane separation modules within a single large vessel or housing (similar to a giant bell jar) which is kept under vacuum during operation. This greatly complicates maintenance of the plurality of separation modules within the vacuum vessel, as, over a period of time, the layers of gaskets in the separation modules begin to loosen, so as to require periodic tightening of the bolts or of the tide rods that hold the gaskets in sealing relation with the membranes. Failure to do this tightening maintenance on a regular basis may result in the gaskets leaking, with consequential loss of separating efficiency in the respective module. Following current practice, it is not possible to access a particular separation modules for tightening or other maintenance without first removing the common vacuum vessel. Such removal cannot be accomplished online, and requires shutting down the entire separation plant, at significant downtime cost. As a result, preventative maintenance, of the type just discussed is not carried out on a routine basis, but is typically left until the lack thereof causes a general plant shut down, with consequent removal of the vacuum vessel.

It should also be appreciated that actual lifting of the vacuum vessel typically requires a heavy duty crane, and, in some instances, such as where the separation plant is located inside of a building, removal of a portion of the ceiling or roof of the building. Furthermore, if any one of the membrane separation modules fails, or otherwise requires maintenance, the entire vacuum vessel containing the plurality of separation modules must be shut down to identify, and service, the particular malfunctioning module. This is both inconvenient and costly.

SUMMARY OF THE INVENTION

It is an object of the present invention to overcome, inter alia, the shortcomings of the prior art described above by providing a separation apparatus that is suitable for use for pervaporation, vapor permeation and vacuum membrane distillation that does not suffer from unduly high production, installation or maintenance costs and undue complexity of assembly.

According to a first aspect of the invention there is provided an apparatus for the separation of a fluid mixture into a permeate and a retentate. This apparatus comprises a separation module defining a substantially horizontal primary axis. The separation module comprises a fluid mixture inlet, a retentate outlet and a permeate outlet. A pair of substantially planar, horizontally extending fluid separation membranes, each pair comprising a first fluid separation membrane and a second fluid separation membrane, with each membrane having an active surface and an oppositely facing secondary surface, with the active surfaces facing one another. A fluid containment gasket is interposed between the pair of fluid separation membranes in sealing engagement with the active surfaces of both membranes of the pair, so as to form, in combination with said first and said second fluid separation membranes, a fluid containment chamber, with the first fluid separation membrane forming a lower end of said fluid containment chamber and the second fluid separation membrane forming an upper end of said fluid containment chamber. The fluid containment gasket has an inlet wall normal to the primary axis, an outlet wall substantially parallel to the inlet wall and axially spaced therefrom, and two opposed sidewalls extending between said inlet wall and the outlet wall in substantially parallel relation to the primary axis. The fluid containment chamber also has an inlet area adjacent the inlet wall, and a outlet area adjacent the outlet wall. A pair of substantially planar, horizontally extending membrane support plates are also provided. Each such pair comprises a first membrane support plate and a second membrane support plate vertically spaced from the first membrane support plate. Each membrane support plate has an upper and a lower surface, a central body portion and a substantially quadrilateral outer perimeter portion having one or more lateral edge portions. Each membrane support plate also has defined therethrough a plurality of elongate horizontal channels, with each elongate channel extending between the central body portion of the membrane support plate to a terminus of the elongate channel located in at least one of the lateral edge portions of the membrane support plate. The secondary surface of the first separation membrane is positioned within the separation module in adjacent overlying relation to the upper surface of the central body portion of the first membrane support plate. The secondary surface of the second separation membrane is positioned in the separation module in adjacent underlying relation to the lower surface of the central body portion of the second membrane support plate. A fluid delivery means provides for egress of the fluid mixture from the fluid mixture inlet into the inlet area of each of said fluid containment chambers. A permeate collecting means provides for collection of the permeate from the terminus of each of the plurality of elongate channels for delivery thereof to the permeate outlet. A retentate collection means provides for collection of the retentate from the outlet area of each of the fluid containment chambers for delivery thereof to the retentate outlet. A feeding means such as a centrifugal pump, feeds the fluid mixture to be separated to the fluid mixture inlet of the separation module.

According to another aspect of the present invention, there is advantageously provided a means for the creation of a negative pressure differential between the fluid containment chamber and the elongate channels. Such pressure differential assists permeation of the permeate across the first and second fluid separation membranes from the fluid containment chamber into the elongate channels of the central body portion of the first and second membrane support plates, for subsequent collection by the permeate collecting means for delivery to the permeate outlet.

According to yet another aspect of the present invention, there is preferably provided a plurality of separation modules and a selector means. The selector means is adapted for the selective configuration of the separation modules into a series configuration, wherein said separation modules are fluidly connected to one another in sequence such that the fluid mixture is fed by the feeding means into the fluid mixture inlet of a first of the separation modules, with the retentate outlet of each of the separation modules being in fluid communication with the fluid mixture inlet of the next of said separation modules in said sequence, and for the selective configuration of said separation modules in a parallel configuration, wherein the feeding means feeds said fluid mixture to the fluid mixture inlet of each of the separation modules for contemporaneous separation of the fluid mixture in each of said separation modules.

According to one embodiment of the present invention, the fluid delivery means comprises a feed distributor positioned within each of said fluid containment chambers adjacent the respective fluid inlet area thereof. The feed distributor has a substantially cylindrical inner bore centred about a substantially vertical fluid inlet axis. A substantially cylindrical outer sidewall is concentrically spaced from said inner bore. A substantially horizontal, planar, annular upper surface extends between said inner bore and said outer sidewall. A substantially horizontal, planar, annular lower surface, spaced apart from the annular upper surface along the vertical axis, extends between the inner bore and the outer sidewall. A plurality of fluid transmission channels are provided withing each feed distributor, with radially extend between the inner bore and the outer sidewall thereof substantially towards the respective outlet wall of the fluid containment chamber within which the feed distributor is positioned.

According to yet another aspect of the present invention, the retentate collection means comprises a retentate receiver positioned within each of said fluid containment chambers adjacent the respective outlet area thereof. The retentate receiver has a substantially cylindrical inner bore surrounding a substantially vertical fluid outlet axis and a substantially cylindrical outer sidewall concentrically spaced from the inner bore. A substantially horizontal, planar, annular upper surface extends between the inner bore and the outer sidewall, and a substantially horizontal, planar, annular lower surface spaced apart from the annular upper surface along said fluid outlet axis extends between the inner bore and the outer sidewall. A plurality of fluid transmission channels radially extend between the inner bore and the outer sidewall substantially towards the respective outlet wall of the fluid containment chamber withing which the retentate receiver is positioned.

According to yet another aspect of the invention, the separation module preferably defines a substantially horizontal primary axis, a substantially vertical fluid inlet axis and a fluid outlet axis substantially parallel to the fluid inlet axis and spaced apart therefrom along the primary axis, and comprises a plurality of pairs of substantially planar, horizontally extending fluid separation membranes, with each pair of separation membranes comprising a first fluid separation membrane and a second fluid separation membrane with each fluid separation membrane having an active surface and an oppositely facing secondary surface, with the active surfaces facing one another. An equal plurality of fluid containment gaskets are interposed one each between each pair of fluid separation membranes in sealing engagement with the active surfaces of both membranes of the respective pair so as to form, in combination with the first and second fluid separation membranes of the respective pair, an equal plurality of fluid containment chambers. The first fluid separation membrane of each pair forms a lower end of the respective fluid containment chamber and the second fluid separation membrane of each pair forms an upper end of the respective fluid containment chamber. The fluid containment gaskets each have, respectively, an inlet wall normal to the primary axis and adjacent to the outlet axis, an outlet wall, adjacent to the outlet axis, substantially parallel to the inlet wall and spaced therefrom along the primary axis, and two opposed sidewalls extending between the inlet wall and the outlet wall in substantially parallel relation to the primary axis. Each of the fluid containment chambers also has a respective inlet area thereof adjacent the inlet wall thereof and a respective outlet area adjacent the outlet wall thereof. A second plurality of substantially planar, horizontally extending membrane support plates is provided, comprising one or more first membrane support plates and one or more second membrane support plates. The first membrane support plates are vertically spaced from the second membrane support plates, and each membrane support plate has a central body portion, and a substantially quadrilateral outer perimeter portion having one or more lateral edge portions The central body portion further has an upper surface, a lower surface and each of the membrane support plates further has defined therethrough a plurality of elongate horizontal channels, with each elongate channel extending between the central body portion of the respective membrane support plate to a terminus of the each elongate channel located in one or more of the edge portions of the respective membrane support plate. The plurality of fluid containment chambers are disposed in vertically-stacked relation within the separation module, with the membrane support plates being interleaved one each in alternating order between the fluid containment chambers. Each of the first separation membranes is positioned in adjacent overlying relation to the upper surface of the central body portion of each first membrane support plate, with the secondary surface of each second separation membrane being positioned in the separation module in adjacent underlying relation to the lower surface of the central body portion of each second membrane support plate, such that the termini of the elongate channels extend laterally beyond the lateral extent of the fluid containment chambers A fluid delivery means for egress of the fluid mixture from the fluid mixture inlet into the inlet area of each of the fluid containment chambers is also provided. A permeate collecting means for collection of the permeate from the terminus of each of the plurality of elongate channels for delivery to the permeate outlet is also provided, as is a retentate collection means for collection of the retentate from the outlet area of each of the fluid containment chambers for delivery to the retentate outlet. Lastly, a feeding means for selectively feeding the fluid mixture to the fluid mixture inlet of the separation module is provided, preferably in the form of a centrifugal pump.

According to another aspect of the present intention, the separation module further comprises an equal plurality of pairs of membrane spacer gaskets, with each such pair of membrane spacer gaskets having a first membrane spacer gasket and a second membrane spacer gasket, each of said first membrane spacer gaskets being disposed between a respective first fluid separation membrane and a respective first membrane support plate so as to hold the respective first fluid separation membrane in spaced relation from said the respective membrane support plate, and wherein each of the second membrane spacer gaskets is disposed between a respective second fluid separation membrane and a respective second membrane support plate to hold the respective second fluid separation membrane in spaced relation from the respective second membrane support plate.

According to yet another aspect of the present intention, the separation module further comprises a second plurality of pairs of spacer meshes with one of the spacer meshes of each pair of spacer meshes being held in contacted relation against the lower surface of the central body portion of each of the membrane supporting plates by a respective one of the second spacer gaskets and with the other one of the spacer meshes of the each pair of spacer meshes being held in contacted relation against the upper surface of the central body portion of each of the membrane supporting plates by a respective one of the first spacer gaskets.

According to yet another aspect of the present invention, the permeate collecting means preferably comprises a shroud member sealingly extending between the base plate and the top plate to form, in combination with the base plate and the top plate, a housing for the membrane support plates, the fluid separation membranes, the spacer meshes, the membrane spacer gaskets, the fluid containment gaskets, the retentate receivers and the feed distributors.

According to yet another aspect of the present invention, there is additionally provided a holding means for immobilizing the membrane support plates, the base plate, the top plate, the fluid separation membranes, the spacer meshes, the membrane spacer gaskets, the fluid containment gaskets, the retentate receivers and the feed distributors, the holding means preferably comprising a plurality of threaded rods rigidly connected to the base plate and extending upwardly therefrom within the shroud member and thence through a corresponding plurality of bores in the top plate; and a corresponding plurality of nuts adjustably, releasably connected to the threaded rods above the top plate, each of the nuts preferably comprising a dome nut with an integral o-ring seal partially projecting from a bottom face thereof for sealing contact with the top plate.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

FIG. 5B is a sectional view along line sight line 5B of FIG. 5A;

FIG. 5C is an enlarged view of a portion of FIG. 5B;

DETAILED DESCRIPTION OF A PREFERRED EMBODIMENT

Figure 1:
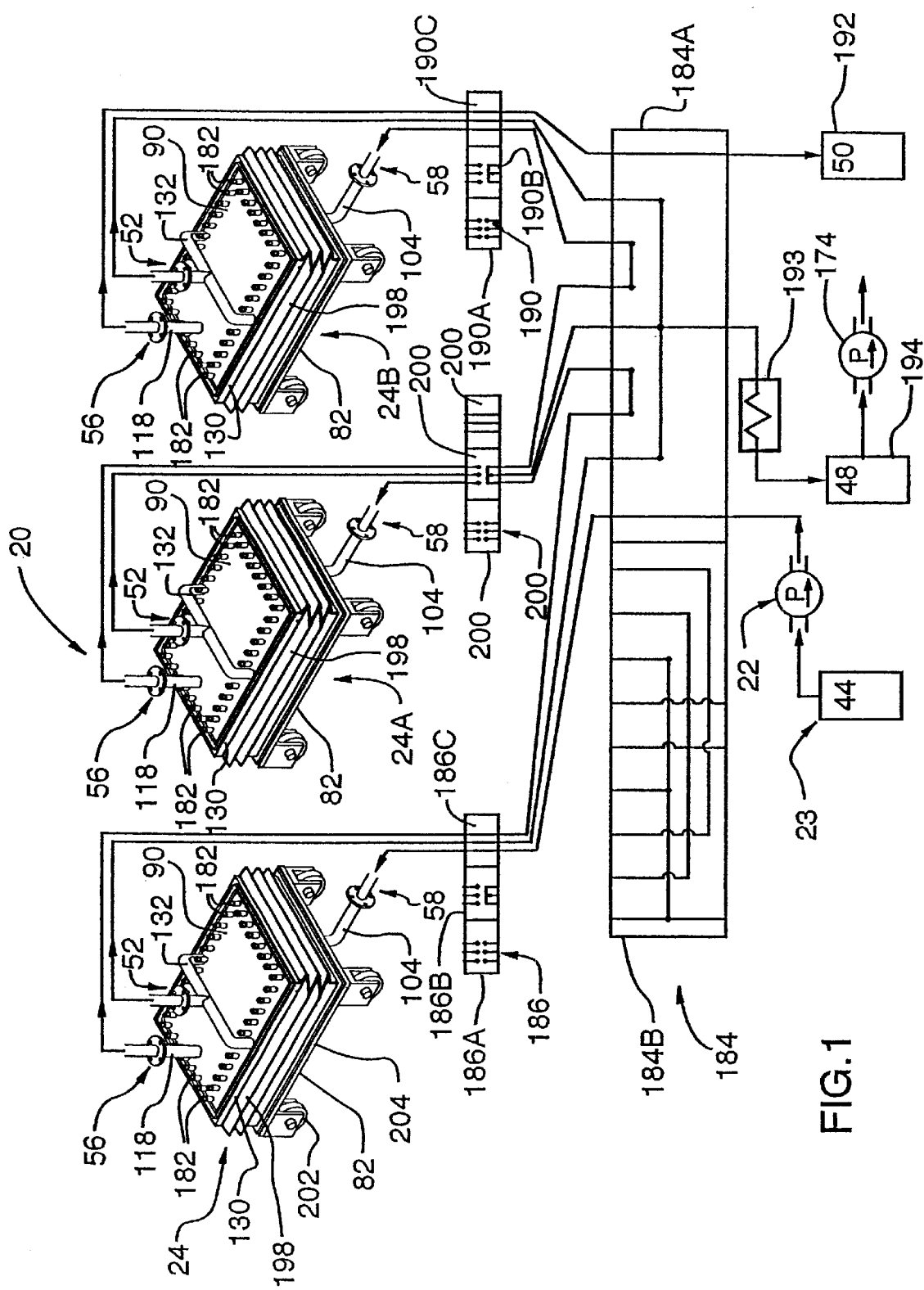
FIG. 1 is a perspective view of a separation apparatus according to a preferred embodiment of the present invention and having three separation modules, a respective two of same being operatively connected in series.

The subject matter of this invention is a separation apparatus for use with fluid mixtures. A preferred embodiment of the present invention is shown in the Figures, where it is designated by general reference numeral 20. With immediate reference to FIGS. 1, and 2A and to diagrammatic representation 2B, the invention will be seen to generally comprise a mixed fluid feeding means, being, a conventional centrifugal pump 22 connected upstream to a reservoir 23 containing a fluid mixture to be separated 44 connected to a plurality of separation modules 24,24A,24B. As best illustrated in FIGS. 2A and 2B, the separation modules 24,24A,24B each have a top plate 90, a base plate 82 and a shroud member 130, which together form a housing 188 within which a plurality of selectively-permeable fluid separation membranes 26,26' are mounted in substantially parallel stacked relation for separation of the initial fluid mixture 44 into a retentate 50 and a permeate 48. The initial fluid mixture 44 (typically in a liquid state) is fed downstream from the pump 22 into each separation module 24,24A,24B by means of a feed pipe 104 connected to each separation module 24,24A,24B. As best seen in FIG. 2A, a first flanged end 106 of the feed pipe 104 defines a fluid mixture inlet 58 in each separation module 24,24A,24B, and a second end 108 of said feed pipe 104 terminates in a fluid inlet port 110 in the base plate 82. By means which will be understood more fully as this description progresses, the fluid feed mixture 44 is fed from the inlet port 110 between pairs of selectively permeable separation membranes 26,26' arranged with their active surfaces 26A,26'A facing inwardly toward one another (see FIG. 2B). A permeate manifold 132 is connected to the housing 188 of each separation module 24,24A,24B, and is in fluid communication with the housing 188 by means of a pair of permeate ducts 136 formed in the top plate 90 (see FIG. 2A). The permeate manifold 132 preferably supplies a vacuum to the interior of the housing 188, which vacuum is brought into intimate contact (by means more fully described below) with the outwardly facing surfaces 26B,26'B of the paired selectively permeable membranes 26,26' to assist in drawing the permeate fraction 48 of the initial feed mixture 44 (typically in the form of a vapor) through the selectively-permeable fluid separation membranes 26,26' and out of the housing 188 through the permeate ducts 136,136 through the permeate manifold 132 to a permeate collection tank 194. Similarly, a retentate exit pipe 118 is provided in each separation module 24,24A,24B for collection and removal of the retentate fraction 50 of the initial feed mixture 44 to a retentate collection tank 192. The retentate fraction 50 passes across the active surface 26A,26'A of each selectively-permeable fluid separation membrane 26,26' in generally parallel relation thereto as it moves toward the retentate exit pipe 118. Each retentate exit pipe 118 has a first end 120 (see FIG. 2A) terminating in a fluid outlet port 122 positioned in the top plate 90 of said each separation module 24,24A,24B, and a second flanged end 124 which defines a retentate outlet 56 thereof. For greater clarity, as the fluid inlet port 110 in the base plate 82, the fluid outlet port 122 in the top plate 90 and the permeate ducts 136 would otherwise be hidden from view in FIG. 2A, they are illustrated in phantom outline. A condenser 193 may also be optionally provided in fluid communication with the permeate manifold 132 and the permeated collection tank 194 for condensing the permeate fraction 48 collected in vapor form into a liquid form for storage in the collection tank 194.

With this background, the preferred embodiment of the present invention will now be described in more detail.

Figure 2A:
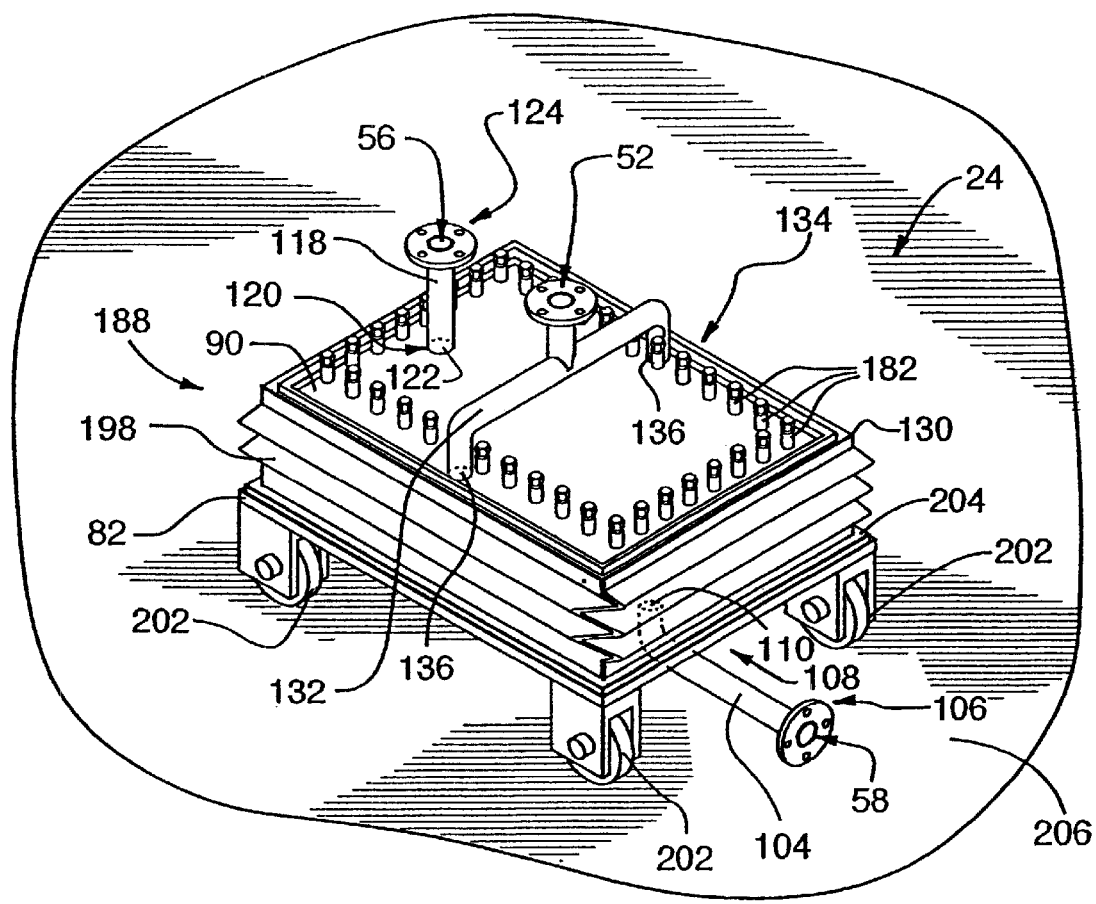
FIG. 2A is an enlarged perspective view of a selected one of the separation modules of FIG. 1.
Figure 2B:
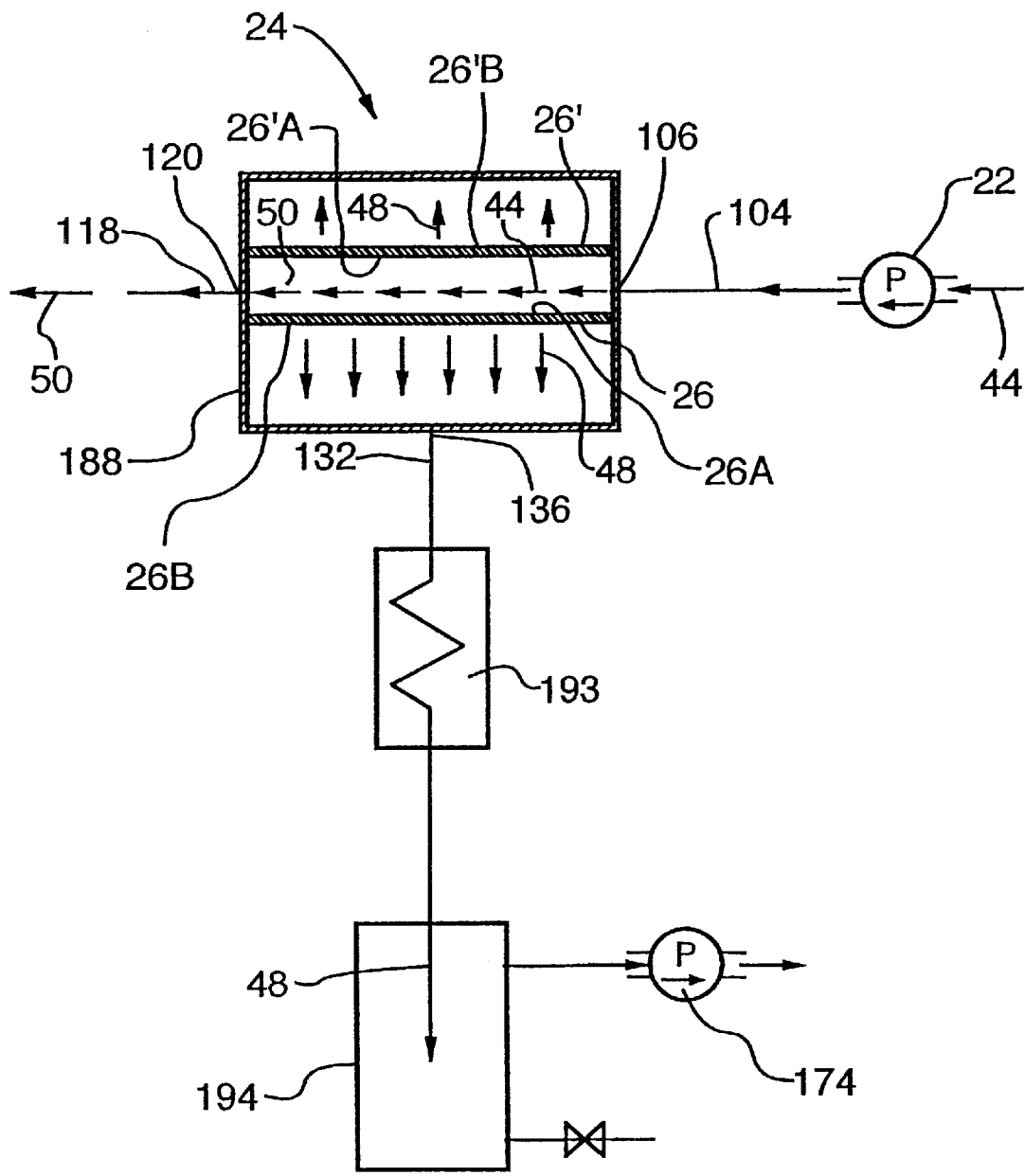
FIG. 2B is a diagrammatic representation illustrating, in a simplified manner, the flow path of fluids through a portion of the separation module of FIG. 2A.

The mixed fluid feeding means is shown diagrammatically in FIG. 1 to comprise a conventional centrifugal pump 22 for liquids. However, it should be understood that the present invention is useful for the separation of a variety of fluid mixtures, and it is intended that the scope of the monopoly claimed encompasses the use of any conventional means of feeding fluid, the choice of which will depend upon, inter alia, the physical properties of the fluid mixture sought to be separated, and will be obvious to persons skilled in the art upon consideration of the following detailed description. Similarly, the fluid mixture inlet 58, retentate outlet 56 and permeate outlet 52 of the separation modules 24 are each illustrated as conventional flanged pipe couplings in the preferred embodiment, as best seen in FIG. 2A, but it will be obvious that the form of coupling, and indeed, the presence of couplings, is not essential to the present invention, and as such, the invention is not be construed so as to be limited to couplings of the forms shown.

In the preferred embodiment illustrated, the fluid separation membranes 26,26' are disposed within each of the housings 188 of the separation module 24,24A,24B in a plurality of pairs, with the lowermost one of each of said pairs being designated by the reference numeral 72 and the uppermost one of each of said pairs being designated by the reference numeral 72'. Two full pairs 72,72' are shown in the centre portion of FIG. 3, with a further half pair constituted by a fluid separation membrane 26' shown adjacent to the bottom plate 82, and a further half pair constituted by a fluid separation membrane 26 shown adjacent to the top plate 90 of the separation module 24 shown in the exploded view of FIG. 3. The fluid separation membranes 26,26' are substantially planar, preferably being of quadrilateral plan outline, and each extend substantially horizontally within the housing 188. Each fluid separation membrane 26,26' has an active surface 26A, 26'A, respectively, which active surfaces face each other when assembled in the pairs 72, 72', as shown. The term "active surface" is used herein and will be understood by those skilled in the art to mean, "that surface of a fluid separation membrane designed to contact the mixed fluid to be separated and which determines the permeability characteristics of the membrane, whether by means of physical or chemical differences in the active surface of the membrane, or both". The specifics of these characteristics will vary in a routine manner, depending upon the precise nature of the initial fluid mixture to be separated and on the permeate and retentate to be separated from said initial mixture. The active surface of each fluid separation membrane 26 is designated by the reference numeral 26A, while the reference numeral 26'A is used to designate the active surface of the fluid separation membrane 26'. The opposite other surface of each fluid separation membrane is referred to in this specification and claims as the "secondary surface" of the respective fluid separation membrane, and is designated for the first fluid separation membranes 26 by the reference numeral 26B, and for the second fluid separation membranes 26' by the reference numeral 26'B. In each pair 72,72' of fluid separation membranes 26,26', the active surfaces 26A and 26'A face each other for reasons that will be apparent as this description proceeds. The choice of a specific material for construction of the fluid separation membranes 26,26' is not a feature of this invention, but is a matter of routine skill and judgement exercisable by those skilled in the art.

A fluid containment gasket 74 is interposed between the first fluid separation membrane 26 and the second fluid separation membrane 26' of each pair 72,72' in sealing engagement with the active surfaces 26A and 26'A of each of such membranes 26,26', respectively. A fluid containment gasket is also interposed between the lowermost fluid separation membrane 26' and the base plate 82, as well as between the uppermost fluid separation membrane 26 and the top plate 90. The fluid containment gaskets 74 can be constructed of any suitable sealing material known to persons skilled in the art, so long as such material is compatible with the particular solvents with which the separation apparatus 20 is intended to be used. This "sandwich" arrangement of a first fluid separation membrane 26 with a fluid containment gasket 74 and a second fluid separation membrane 26' serves to forms a fluid containment chamber 30 for each pair 72,72' of membranes, with the first fluid separation membrane 26 forming a lower end of each such fluid containment chamber 30 and the second fluid separation membrane 26' forming an upper end of each fluid containment chamber 30. In the special case of the half pair constituted by the second fluid separation membrane 26' shown adjacent to the bottom plate 82, the lower end of that particular fluid containment chamber is formed by the bottom plate 82. In the special case of the half pair constituted by the first fluid separation membrane 26 shown adjacent to the top plate 90 of the separation module 24, the upper end of that particular fluid containment chamber is formed by the top plate 90. Stainless steel is the preferred material for the top plate 90 and the base plate 82, for corrosion resistance, strength and durability, although other materials such as carbon steel or other alloy steel products may be used.

Figure 4:
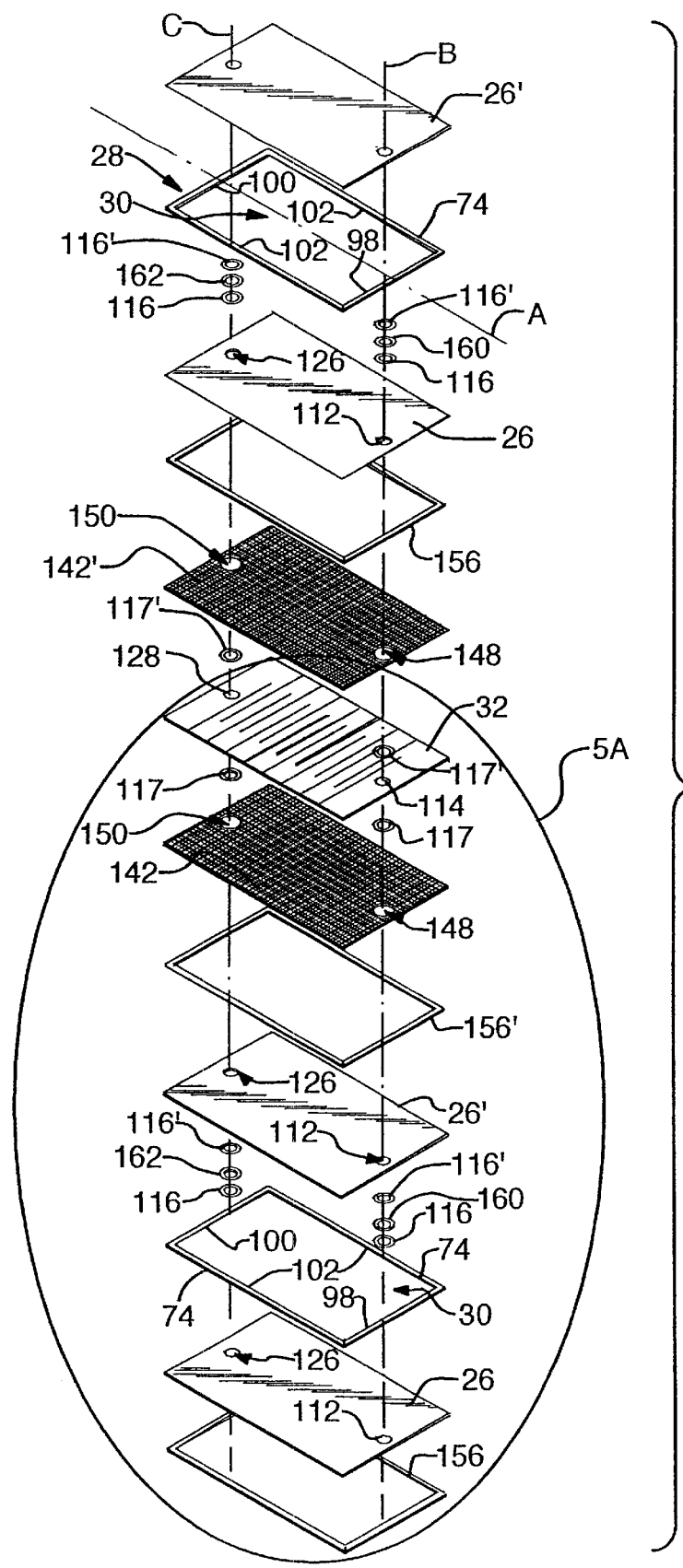
FIG. 4 is an enlarged perspective view of the components shown in the circumscribed area "4" of FIG. 3.
Figure 5A:
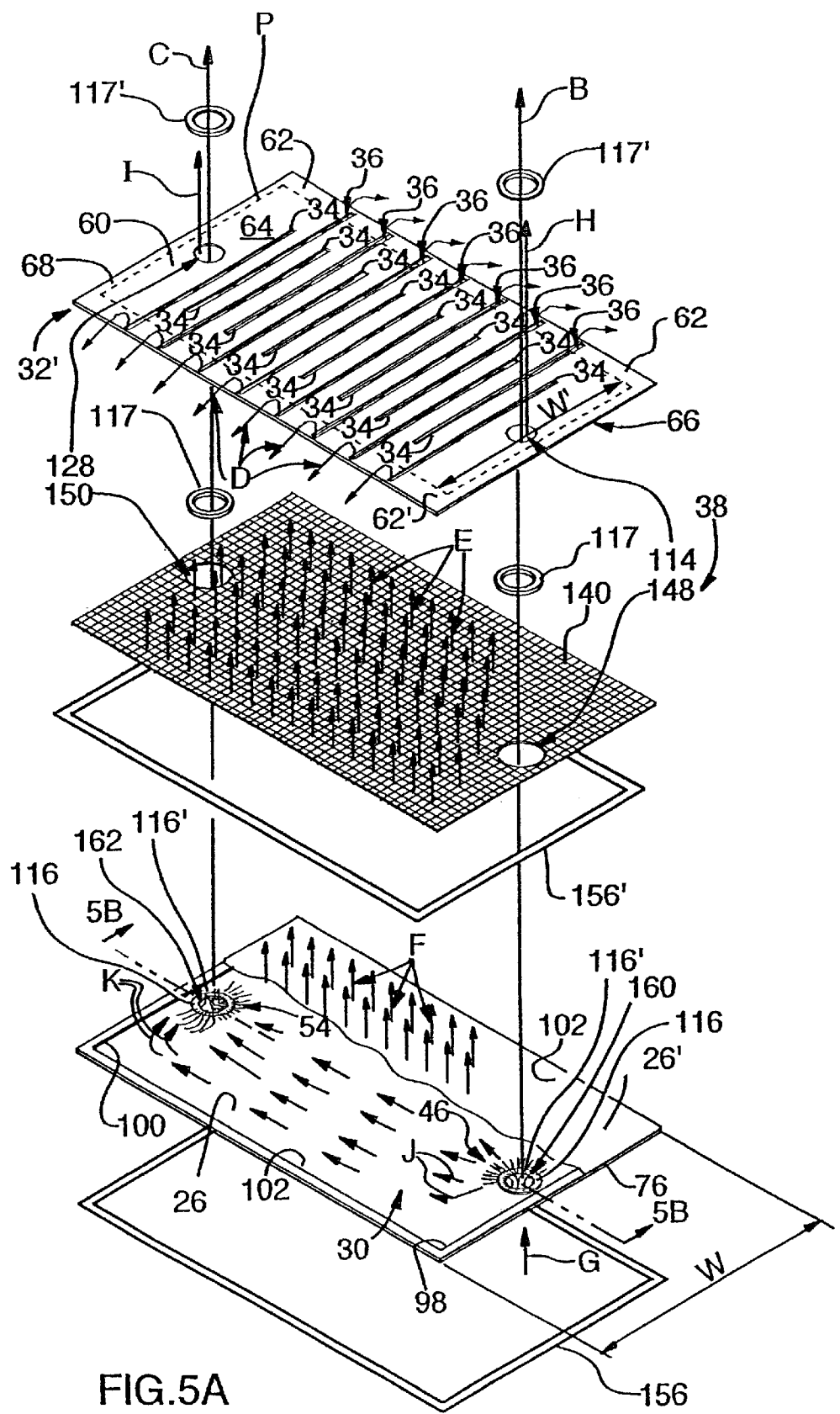
FIG. 5A is an enlarged perspective view of the components shown in the circumscribed area "5A" of FIG. 4.

Each separation module 24, 24A,24B defines a respective substantially vertical fluid inlet axis "B" and a fluid outlet axis "C" parallel to said fluid inlet axis "B" and spaced apart therefrom along the primary axis "A". As best illustrated in FIGS. 4 and 5A, the fluid containment gaskets 74 each have, respectively, an inlet wall 98 normal to the primary axis "A" and adjacent to the fluid inlet axis "B", an outlet wall 100 adjacent to the fluid outlet axis "C", substantially parallel to the inlet wall 98 and spaced therefrom along the primary axis "A", and two opposed sidewalls 102 extending between said inlet wall 98 and said outlet wall 100 in substantially parallel relation to said primary axis "A". As seen in FIG. 5A, an inlet area 46 of each of the fluid containment chambers 30 is defined adjacent the inlet wall 98 thereof, and an outlet area 54 of each of the fluid containment chambers 30 is defined adjacent the outlet wall 100 thereof.

Figure 3:
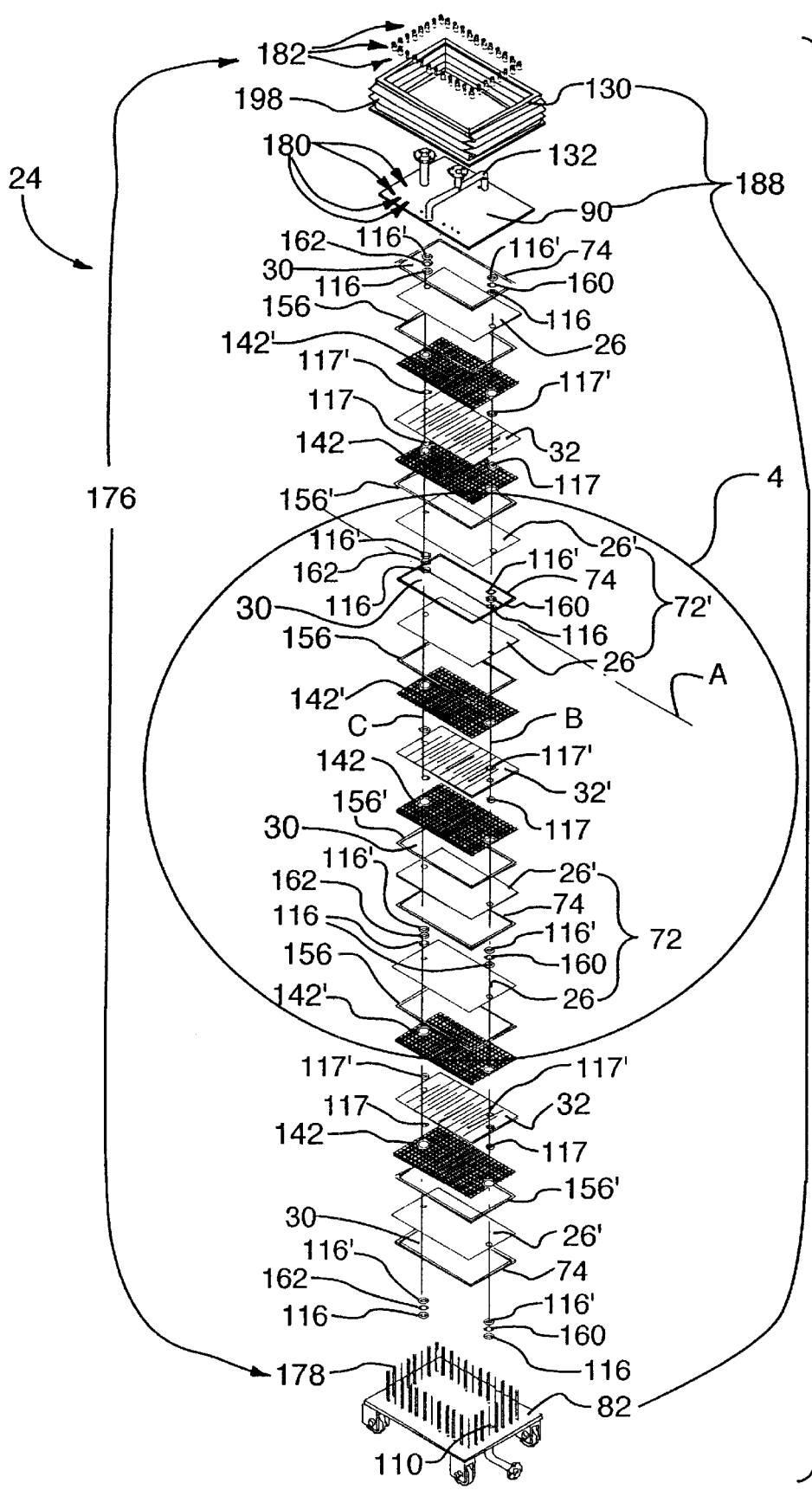
FIG. 3 is an exploded perspective view of the selected separation module of FIG. 2A.

There is also provided within each of the separation modules 24,24A,24B a second plurality (which may or may not be the same in number as the plurality of fluid containment gaskets 74, or the plurality of pairs of fluid separation membranes 26,26' mentioned herein) of substantially planar, horizontally extending membrane support plates, comprised of first membrane support plates 32 and second membrane support plates 32' which are positioned in vertically-stacked, spaced-apart relation to one another. As best seen in FIG. 5A, each of the membrane support plates 32,32' has a central body portion 60 and a pair of lateral edge portions 62,62'. The central body portion 60 of each membrane support plate 32,32' has an upper surface 64, a lower surface 66 and a substantially quadrilateral outer perimeter portion 68, which perimeter portion includes the two lateral edge portions 62,62' and is demarcated from the central body portion 60 in FIG. 5A by dashed rectangle "P". The channels 34 defined through each membrane support plate 32,32' are elongate, and each extend between the central body portion 60 of said each membrane support plate 32,32' to the respective terminus 36 of said each elongate channel 34, each of which termini is located, in alternating order, in one or other of the lateral edge portions 62 or 62' of each of the membrane support plates 32,32'. Each of the elongate channels 34 is aligned substantially normal to the respective primary horizontal axis "A" defined by the separation module 24, as illustrated in FIG. 3. The lateral edge portions 62,62' are positioned one each on opposite lateral sides of the primary axis "A" in substantially parallel relation to said primary axis, such that the termini of said elongate channels 34 are positioned in said two lateral edge portions 62,62' in staggered alternating relation. The membrane support plates 32, 32' are preferably formed of stainless steel, or other strong, resilient and corrosion-resistant material.

It will be appreciated from a review of the figures that the fluid containment chambers 30 are disposed in vertically-stacked relation within each of the separation modules 24,24A,24B, with the membrane support plates 32,32' being interleaved one each in alternating order between said fluid containment chambers 30. That is, as seen in FIG. 3, the lowermost membrane support plate 32 has a lowermost fluid containment chamber 30, defined by the lowermost pair 72 of fluid separation membranes 32,32', interposed between it and the next highest membrane support plate 32', which is followed in vertical order by the second pair 72' of fluid separation membranes 32,32'. This arrangement can, in theory, be continued ad infinitum. It will also be noticed that this arrangement provides for the placement of the secondary surface 26B of each of the first fluid separation membranes 32 in overlying relation to the upper surface 64 of the central body portion 60 of an adjacent one of the first membrane support plates 32. Moreover, this arrangement also provides for the placement of the secondary surface 26'B of each of the second fluid separation membranes 26' in adjacent underlying relation to the lower surface 66 of the main body portion 60 of an adjacent one of the second membrane support plates 32'. It will also be appreciated that the lateral width "W" of each of the fluid containment chambers is equal to, or less than, the lateral width "W'" of each of the fluid containment chambers 30, such that each terminus 36 of each of the elongate channels 34 projects laterally beyond the lateral extent of each of the fluid containment chambers 30 into the interior of the housing 188, so as to facilitate the flow of permeate fraction 48 therefrom. In the preferred embodiment illustrated, the lateral width "W" of the fluid containment chamber is substantially the same as the width "W'" of the demarcated rectangle "P" shown on the membrane support plate 32', (as illustrated best in FIG. 5A), so as to allow the termini 36 in each of the lateral edge portions 62 and 62' to extend in free fluid communicating relation with the interior of the housing 188, thereby to facilitate the flow of the permeate fraction 48 from the elongate channels 34 into the housing 188 and thence out of the housing 188 through the permeate ducts 136,136. In fact, in the preferred embodiment illustrated, all of the outside perimeter dimensions of the fluid containment chambers 30 are substantially congruent with the perimeter dimensions of the main body portion 60 (as demonstrated by the demarcated rectangle "P"), leaving the perimeter portion 68 of the membrane support plates 32, 32' exposed to the ambient atmosphere within the housing 188.

A fluid delivery means is provided for egress of the fluid mixture 44 from the fluid mixture inlet 58 into the inlet area 46 of each of the fluid containment chambers 30 and comprises, in the preferred embodiment illustrated, the feed pipe 104; a fluid inlet port 112 in each fluid separation membrane 26,26' passing therethrough and centred about the fluid inlet axis "B"; a feed distributor 160 positioned within each fluid containment chamber 30, a fluid inlet port 114 in each membrane support plate 32,32' passing therethrough between the upper surface 64 and the lower surface 66 of the central body portion 60 thereof and centred about the fluid inlet axis "B", together with a full set of gaskets 116,116',117 and 117' necessary to seal together the various components mentioned in this paragraph (as described more fully below) so as to avoid significant loss of the fluid mixture 44 upon delivery to each of the fluid containment chambers 30.

As seen best in FIGS. 4, 5A, 5B, 5C, 6A and 6B, an annular gasket 116', is employed to seal a fluid outlet port 126 of each second fluid separation membrane 26' to the annular upper surface 168 of a retentate receiver 162 positioned within the fluid containment chamber 30, and a second annual gasket 116' is employed to seal the fluid inlet port 112 of each second fluid separation membrane 26' to the annular upper surface 168 of the feed distributor 160 positioned within the fluid containment chamber 30 of which said second fluid separation membrane 26' forms an upper end. Another annular gasket 116, is employed to seal the fluid outlet port 126 of each first fluid separation membrane 26 to the annular lower surface 170 of the retentate receiver 162 positioned within the fluid containment chamber 30, and yet another annular gasket 116 is required to seal the fluid inlet port 126 of each first fluid separation membrane 26 to the annular lower surface 170 of the feed distributor 160 positioned within the fluid containment chamber 30. Two further annular gaskets 116,116 are required, one each, to seal the annular lower surface 170 of the retentate receiver 162 positioned within the lowermost fluid containment chamber 30 against the base plate 82 and to seal the annular lower surface 170 of the feed distributor 160 positioned within the lowermost fluid containment chamber 30 against the fluid inlet port 110 in the base plate 82. Also, a further annular gasket 116' is required to seal the annular upper surface 168 of the feed distributor 160 positioned within the uppermost fluid containment chamber 30 against the top plate 90 and another annular gasket 116 to seal the annular upper surface 168 of the retentate receiver 162 positioned within the uppermost fluid containment chamber 30 against the fluid outlet port 122 in the top plate 90. Similarly, another two annular gaskets 116,116 are required, one each, to seal the annular lower surfaces 170,170 of each of the feed distributor 160 and the retentate receiver 162 positioned within the lowermost fluid containment chamber 30 to the base plate 82 below. Also two annular gaskets 116',116' are required, one each, to seal the annular upper surfaces 168, 168 of each of the retentate receiver 162 and feed distributor 160 positioned within the lowermost fluid chamber 30 to active surface 26'A of the second fluid separation membrane 26' positioned above the base plate 82.

A plurality of annular gaskets 117, 117' constructed from inert, compressible materials, are also provided. These are used to seal the fluid inlet port 112 of each of the first fluid separation membranes 26 to the fluid inlet port 114 of the respective membrane support plates 32,32' having the upper surface 64 adjacent to which said each first fluid separation membrane 26 is positioned, and to seal the fluid inlet port 112 of each second fluid separation membrane 26' to the fluid inlet port 114 of the respective membrane support plate 32' having the lower surface 66 adjacent to which said each second fluid separation membrane 26' is positioned.

It will be evident that fluid fed to the respective fluid mixture inlet 58 of a selected one of the separation modules 24, 24A 24B from, for example, the centrifugal pump 22, will travel through the feed pipe 104; through the fluid inlet port 110 in the base plate 82; and into a lowermost of the fluid containment chambers 30. From there, a portion of the fluid will travel through said fluid containment chamber 30, and the balance of the fluid will travel, through the fluid inlet ports 112, 114 in the fluid separation membranes 26,26' and the membrane support plates 32,32' into each of the other of the plurality of fluid containment chambers 30, whereat the fluid is contacted against the active surfaces 26A,26'A of the selectively-permeable membranes 26,26' as previously discussed. Reference to FIGS. 5A, 5B and 5C are particularly illustrative of the foregoing: the arrow designated by reference letter "G" depicts the flow of the initial fluid mixture 44 into a fluid containment chamber 30 having a first 26 and a second 26' fluid separation membrane; the arrows designated by reference numeral "J" depict the flow of a portion of the fluid through the feed distributor 160 into the fluid containment chamber 30; and the arrow designated by reference numeral "H" depicts the flow of fluid into each of the remaining plurality of fluid containment chambers 30.

A retentate collection means is provided for collection of the retentate 50 from the outlet area 54 of each of the fluid containment chambers 30 for delivery to the retentate outlet 56. The retentate collection means comprises, in the preferred embodiment: the retentate exit pipe 118; a fluid outlet port 126 in each of the fluid separation membranes 26,26' passing therethrough and centred about the fluid outlet axis "C"; and a fluid outlet port 128 in each of the membrane support plate 32,32' passing therethrough between the upper surface 64 and the lower surface 66 of the central body portion 60 thereof and centred about the fluid outlet axis "C". The fluid outlet port 126 of each first fluid separation membrane 26 is sealed, by an annular gasket 117, to the fluid outlet port 128 of the respective membrane support plate 32 having its upper surface 64 adjacent to which said first fluid separation membrane 26 is positioned, and the fluid outlet port 126 of each second fluid separation membrane 26' is sealed by an annular gasket 117 to the fluid outlet port 128 of the respective membrane support plate 32' having its lower surface 66 adjacent to which said second fluid separation membrane 26' is positioned. The retentate collection means further comprises all of the annular gaskets 116,116' mentioned above as necessary to seal together the various components of the apparatus 20 so as to avoid any significant loss of the retentate fraction 50 upon collection and delivery thereof from the outlet area 54 of each of the fluid containment chambers 30 to the retentate outlet 56.

Again, it will be evident to those skilled in the art that feeding of the fluid mixture 44 into the fluid containment chambers 30 will cause retentate 50, namely, that portion of the fluid mixture 44 that does not permeate through the fluid separation membranes 26,26', to flow through the fluid outlet ports 128, 126 in the membrane support plates 32,32' and the fluid separation membranes 26,26'; through the fluid outlet port 122 in the top plate 90; into the retentate exit pipe 118 and thence to the retentate outlet 56. Again, reference to FIGS. 5A, 5B and 5C is instructive, wherein the arrows designated with reference letter "K" depict the flow of fluid towards the fluid outlet port in the fluid separation membranes 26,26', and the arrow designated by reference letter "I" depicts the flow of fluid toward the retentate exit pipe 118.

Once the fluid is contacted against the active surfaces 26A,26'A of fluid separation membranes 26,26' as previously indicated, permeation of the permeate 48 occurs through each of the first fluid separation membranes 26 from the fluid containment chamber 30 of which said each first fluid separation membrane 26 forms the lower end into the elongate channels 34 of the central body portion 60 of the membrane support plate 32 having said upper surface 64 adjacent to which said first fluid separation membrane 26 is overlain, and through each of the second fluid separation membranes 26' from the fluid containment chamber 30 of which said each second fluid separation membrane 26' forms the upper end into the elongate channels 34 of the central body portion 60 of the membrane support plate 32' having the lower surface 66 adjacent to which said second fluid separation membrane 26' is underlain. The arrows designated in FIGS. 5A, 5B and 5C with reference letter "F" indicate the flow of permeate 48 through a first and second separation membranes 26,26' and are illustrative of the foregoing.

It will be evident that the permeate 48 will freely flow through the elongate channels 34 to their respective termini 36, and accordingly, the permeate collecting means is for collection of the permeate 48 from the terminus 36 of each of said plurality of elongate channels 34 to the permeate outlet 52. In the preferred embodiment illustrated, the permeate collecting means comprises a shroud member 130 sealingly extending between the base plate 82 and the top plate 90 to form, in combination with the base plate 82 and the top plate 90, a housing 188 for enclosing, inter alia, the membrane support plates 32,32', the fluid separation membranes 26,26', and the fluid containment gaskets 74; together with the permeate manifold 132. It will be evident to persons skilled in the art that permeate 48 that has permeated through the fluid separation membranes 26 will flow through the elongate channels 34 in the membrane support plates 32 to the termini 36 of said elongate channels 34, thence within the shroud member 130 to the ducts 136 in the top plate 90; and through the permeate manifold 132 to the permeate outlet 52. The arrows in FIG. 5A designated by reference letter "D" are illustrative of the flow of permeate 48 from the termini 36 of the elongate channels 34.

Each separation module 24,24A,24B also has preferably positioned within it an equal plurality of pairs of substantially rectangular membrane spacer gaskets, with each such pair comprising a first membrane spacer gasket 156 and a second membrane spacer gasket 156'. Each of the first membrane spacer gaskets 156 is disposed between a respective first fluid separation membrane 26 and a first membrane support plate 32, so as to hold said respective first fluid separation membrane 26 in spaced relation from said first respective membrane support plate 32, and wherein each of the second membrane spacer gaskets 156' is disposed between a respective second fluid separation membrane 26' and a respective second membrane support plate 32' to hold said respective second fluid separation membrane 26' in spaced relation from said respective second membrane support plate 32'.

Each separation module 24,24A,24B also has preferably positioned within it a second plurality of pairs of substantially rectangular spacer meshes 142,142' with one of the spacer meshes 142 being held in contacted relation against the lower surface of the central body portion of each of said membrane supporting plates 32,32' by a respective one of the second spacer gaskets 156', and with the other one of the spacer meshes 142' being held in contacted relation against the upper surface of the central body portion of each of said membrane supporting plates 32,32' by a respective one of the first spacer gaskets 156. The spacer meshes 142, 142' promote even distribution of vacuum across the secondary surfaces 26B, 26B', thereby to facilitate the flow of the permeate 48 through the selectively permeable separation membranes 26, 26' into the elongate channels 34. From the elongate channels 34, the permeate moves laterally outwardly to the respective termini 36 in the lateral edge portions 62,62'. A first opening 148 is cut into spacer mesh 140 centred about the fluid inlet axis "B", as is a second opening 150 centred about the fluid outlet axis "C". The first 148 and second openings 150 accommodate the passage of the annular gaskets 117,117' through the spacer screens for respective sealing contact of the fluid outlet ports 128,126 and fluid inlet ports 114, 112 of the membrane support plates 32,32' and the fluid separation membranes 26,26' as described previously, which sealing is necessary for operational efficiency of the apparatus 20. With this construction, the membrane spacer gaskets 156,156' work with the spacer meshes 140',140 to prevent distortion of the fluid separation membranes 26,26', which is advantageous for the purpose of minimizing leakage of the fluid containment chambers 30.

As best illustrated in FIGS. 5A, 5B, 5C, and 6A, the fluid delivery means additionally comprises a feed distributor 160 positioned within each of said fluid containment chambers 30 adjacent the respective inlet area 46 thereof. As best illustrated in FIGS. 5A, 5B, 5C and 6B, the retentate collection means additionally comprises a retentate receiver 162 positioned within each of said fluid containment chambers 30 adjacent the respective outlet area 54 thereof. A typical retentate receiver 162 is illustrated in FIG. 6B, where it will be seen to have a substantially cylindrical inner bore 164 centred about the fluid outlet axis "C"; a substantially cylindrical outer sidewall 166 concentrically spaced from said inner bore 164; a substantially horizontal, planar, annular upper surface 168 extending between the inner bore 164 and the outer sidewall 166; a substantially horizontal, planar, annular lower surface 170 spaced apart from said annular upper surface 168 along said fluid outlet axis "C" and extending between said inner bore 164 and said outer sidewall 166; and a plurality of fluid transmission channels 172 radially extending between said inner bore 164 and said outer sidewall 166 substantially towards the respective outlet wall 100 of the fluid containment chamber 30 within which said retentate receiver 162 is positioned. The outer sidewall 166 need not be cylindrical as just described; rather it can have a square or rectangular plan outline, on, indeed, any closed-sided polygonal shape when seen in plan outline.

Figure 6A:
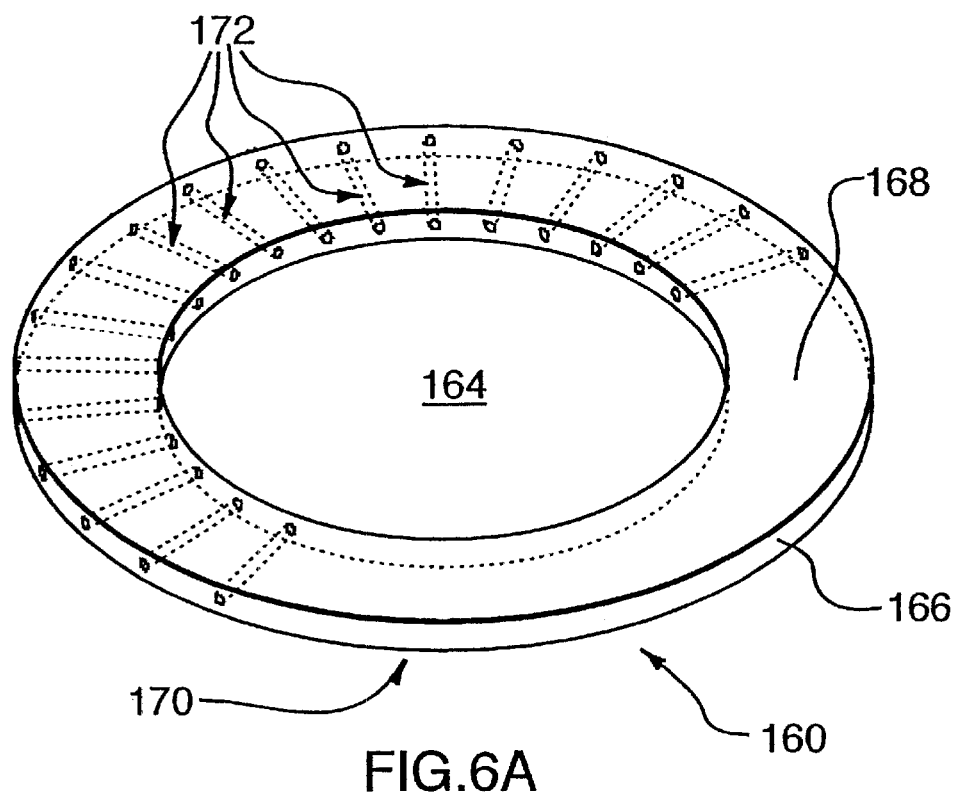
FIG. 6A is an enlarged perspective view of a component of FIG. 5B, with hidden features thereof shown in phantom outline.
Figure 6B:
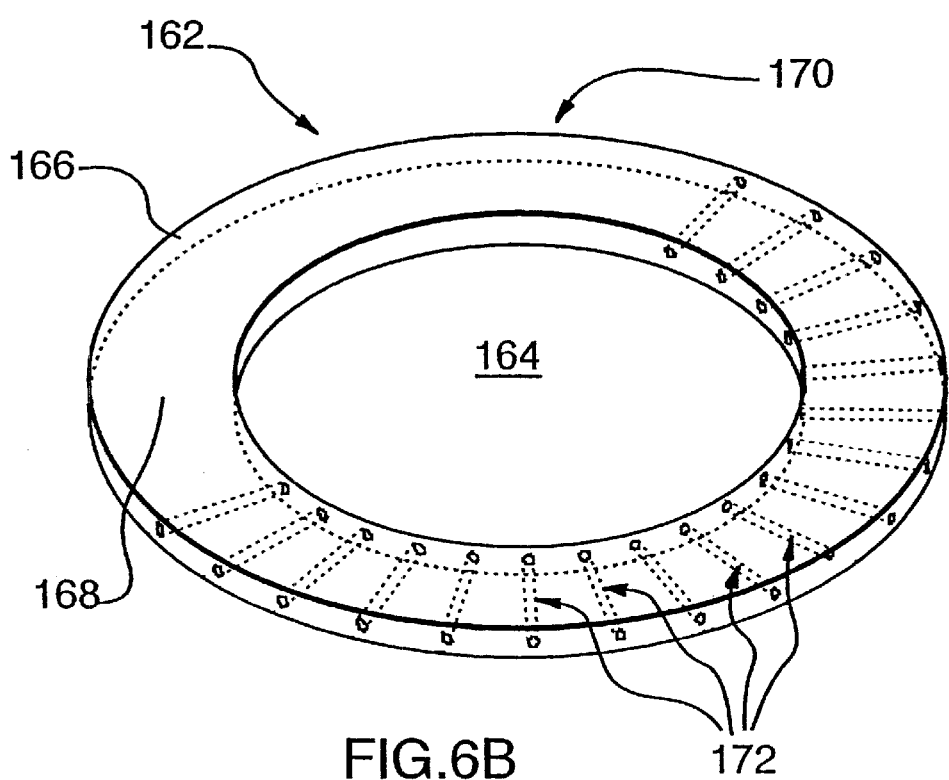
FIG. 6B is view similar to FIG. 6A of another component of FIG. 5B.

A typical feed distributor 160 is shown in FIG. 6A. It will be noted from a comparison of the FIGS. 6A and 6B that the feed distributors 160 are of substantially the same construction as the retentate receivers 162, so that the same reference numerals have been used in FIGS. 6A and 6B to designate analogous structures thereof; however, when the separation modules are assembled, it will be understood that the inner bores 164 of all of the feed distributors are centred about the fluid inlet axis "B", while the inner bores 164 of all of the fluid distributors 160 are centred about the fluid outlet axis "C". As preferentially shown in the figures, the fluid transmission channels 172 do not extend around the entire circumference of either the feed distributors 160 or the retentate receivers 162. Rather, on account of the linear nature of the fluid separation chambers 30 and the placement of the inlet ports 112 and the outlet ports 126 adjacent the opposite ends thereof, it is not particularly efficient to direct a significant proportion of the fluid mixture 44 entering a fluid containment chamber 30 towards the inlet wall 98, as the area of the active surfaces 26A,26'A available for permeation adjacent thereto is not significant. Similarly, it is not particularly efficient to collect retentate from the area between the outlet wall 100 and a retentate receiver 162. For this reason, said transmission channels 172 preferably extend around the outer sidewall 166 of each of the feed distributors 160 and the retentate receivers 162 for only about 240° of the circumferences of both, with the transmission channels 172 of the feed distributors 160 being directed oriented toward the transmission channels 172 of the retentate receivers 162, as best seen in FIGS. 5A and 5B. This construction and arrangement of the feed distributors 160 and the retentate receivers 162 is advantageous in creating turbulence of the fluid mixture 44 as it enters a particular fluid containment chamber 30 and moves across the active surfaces 26A,26'A of the fluid separation membranes 26,26'. Moreover, such turbulence is important in preventing the formation of a so-called "boundary layer" of the fluid mixture 44 immediately adjacent to the active surface 26A or 26' of the fluid separation membranes 26,26', a phenomenon which is well-known in the art to reduce the efficiency of separation processes utilizing semi-permeable membranes.

Advantageously, a means is provided for the creation of a negative pressure differential between each of the fluid containment chambers 30 and the elongate channels 34, said pressure differential assisting permeation of the permeate 48 through each of the first fluid separation membranes 32,32' into the elongate channels 34 formed in the central body portion 60 of the membrane support plates for subsequent collection by the permeate collecting means, as previously described. In the preferred embodiment illustrated, this means comprises a conventional vacuum pump 174 in fluid communication with the permeate outlet 52.

Figure 7A:
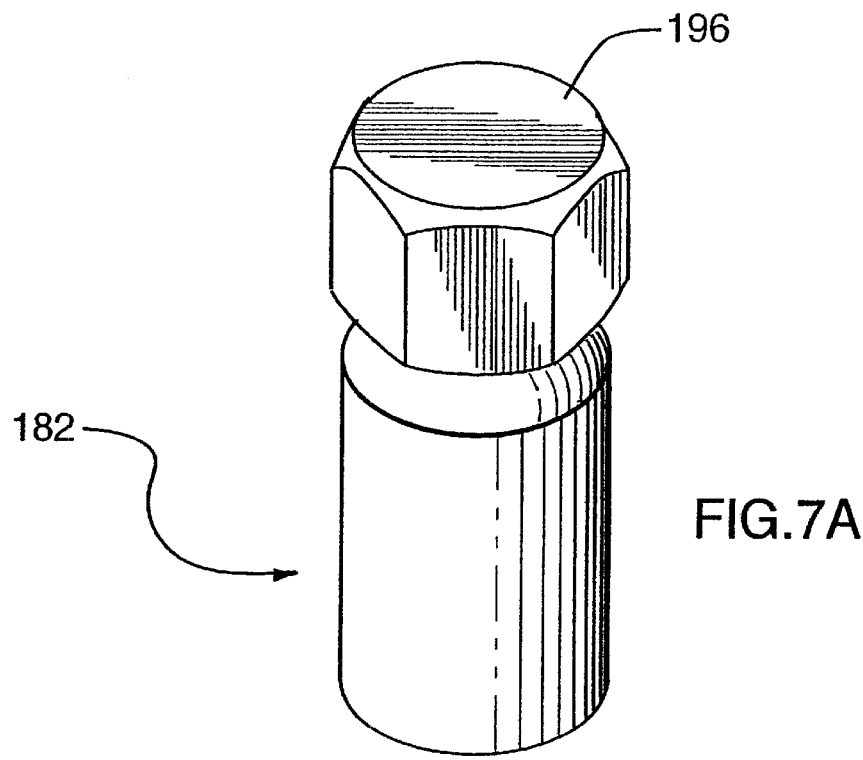
FIG. 7A is a side elevation of the component of FIG. 7A, with hidden features thereof shown in phantom outline.
Figure 7B:
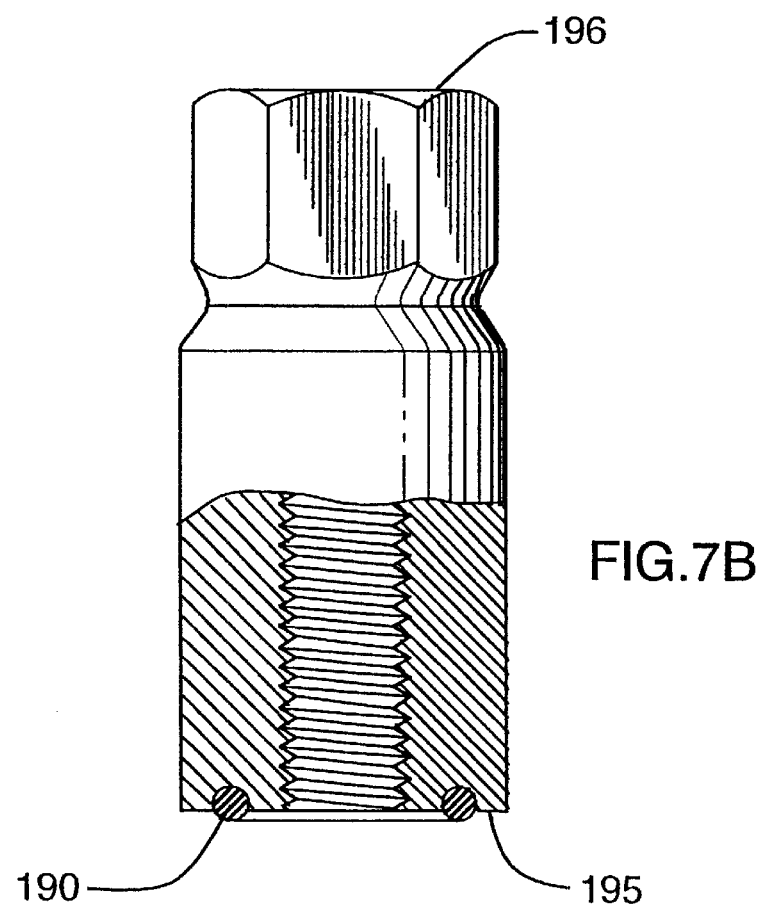
FIG. 7B is an enlarged perspective view of a component of FIG. 2A.

Holding means 176 are also provided for immobilizing the membrane support plates 32,32', the base plate 82, the top plate 90, the fluid separation membranes 26,26', the spacer meshes 142,142' the membrane spacer gaskets 156, 156', the fluid containment gaskets 74, the retentate receivers 162 and the feed distributors 160 in close proximity to one another in their operative configurations. As best indicated in FIG. 3, the holding means 176 preferably comprises a third plurality of threaded rods 178 (which may or may not be equal to said plurality and to said second pluralities mentioned above and in the claims appended hereto, but is most certainly greater than same) and a corresponding third plurality of dome nuts 182. The threaded rods 178 are rigidly connected to the base plate 82 and extend upwardly therefrom within the shroud member 130 in generally parallel relation to the axis "B" and "C", in surrounding, spaced relation to said membrane support plates 32,32', fluid separation membranes 26,26' etc., and thence through a corresponding third plurality of bores 180 in the top plate 90. Each dome nut 182 (a sample of which is shown in detail in FIGS. 7A and 7B) respectively engages one of the threaded rods 178 for tightening down the top plate 90, which assists in sealing of the fluid containment gaskets 74 with the respective selectively-permeable fluid separation membranes 26,26' with which they are in abutting relation, as previously described. The dome nuts are tightened to a predetermined torque setting designed to assure a positive seal between the components which are sealable to one another in the respective manners described above. As best illustrated in FIG. 7B, the dome nuts 182 each have an integral o-ring seal 190 partially projecting from a bottom face 195 thereof for sealing contact with the top plate 90 as the dome nuts 182 are tightened down, which seal 190 surrounds a respective one of the threaded rods 178 to assist in maintaining a vacuum within the housing 188.

It will be appreciated that as the separation modules 24,24A,24B are used for a period of time, the cycling of heat and pressure therein may cause the fluid containment gaskets 74, the membrane spacer gaskets 156,156', and the annular gaskets 116,116',117 to shrink in a vertical dimension. If the separation modules 24,24A,24B are not adjusted to accommodate for such vertical shrinkage, the integrity of the critical seals existing between the components as detailed above may be lost. Such loss of seal will seriously impair the separation efficiency of the separation module(s) 24,24A,24B experiencing such a lost of seal. However, routine tightening of the dome nuts 182 to specified torque settings on a regular basis (even during operation) will accommodate said vertical shrinkage, and thereby prevent unnecessary down time of a particular separation module 24,24A,24B. This is a distinct advantage over prior art systems, where a single large housing is used to enclose all components under vacuum, with no readily accessible bolts, nuts or other adjustment means being accessible without disassembly of the entire housing following system shutdown. With the present invention, such shutdowns (which occur in the prior art on a relatively regular basis because of this lack of an adjustment feature) can be avoided by routine maintenance. Tightening of the dome nuts 182 in this manner will result in a reduction in the overall vertical height of the stack of selectively-permeable fluid separation membranes 26,26' support plates 32,32', fluid containment gaskets 74, the membrane spacer gaskets 156,156' and other structural components positioned within the housing 188 as the top plate 90 moves vertically downwardly under the urging of the tightened dome nuts 182. An operative limit for tightening of the dome nuts 192 is provided by a cap portion 196 integrated into the top of each dome nut 192. Once this limit is reached, it may be an indication that the components within the housing 188 are due for replacement or reconditioning. Alternatively, this may be an indication that it is necessary to add more fluid containment chambers 30, or other stacked components already described, to the stack within the housing 188 so as to bring the vertical height of such components to within an acceptable operative range.

The shroud member 130 is particularly adapted to accommodate the downward movement of the top plate 90 upon tightening of the dome nuts 192 by incorporating a bellows section 198 which is vertically contractible upon loosening of said dome nuts 192. The bellows section 198 is similarly expandable when the dome nuts 192 are loosened, as for example when it is wished to add new stacked components into the housing 188. The bellows section 198 must be substantially rigid, with only controlled flexibility, in order to sustain the negative pressure generated within the housing 188 as required for proper migration of the permeate 48 across the selectively-permeable fluid separation membranes 26. As illustrated in the figures, the bellows section is integrally formed with the shroud member 130 of a light, but strong metal, such as stainless steel to have an accordion-like vertical cross-sectional profile. Other conventional materials having the requisite strength characteristics could also be used, their selection being a matter of routine design choice.

In the preferred embodiment illustrated in FIG. 1, there is provided three separation modules 24, 24A and 24B. Also provided are a selector means 184, and three triple-acting fluid switches, comprising a first fluid switch 186, a second fluid switch 200 and a third fluid switch 190. The selector means 184 and the triple-acting fluid switches 186, 200, 190 are illustrated in FIG. 1 in schematic form, and it will be evident to persons skilled in the art that the selector means 184 has a series configuration 184A thereof and a parallel configuration 184B thereof, and that each of the fluid switches 186, 200 and 190 have a closed position 186A, 200A and 190A, a series bypass position 186B, 200B and 190B and an open position 186C, 200C and 190C. In the preferred embodiment illustrated, the selector means 184 is shown in the series configuration 184A thereof; the first fluid switch 186 and the third fluid switch 190 are shown in the open configurations 186C, 190C; and the second fluid switch 200 is shown in the series bypass position 200B thereof. As so configured, it will be evident to persons skilled in the art that the fluid mixture 44 is fed by the centrifugal pump 22 into the fluid mixture inlet 58 of the first separation module 24, with the retentate outlet 56 of the first separation module 24 being in fluid communication with the fluid mixture inlet 58 of the third separation module 24B. However, it will be understood that selective repositioning of the second fluid switch 200 to the open position 200C (not shown) would cause the retentate outlet 56 of the first separation module 24 to be in fluid communication with the fluid mixture inlet 58 of the second separation 24A module, and the retentate outlet 56 of the second separation module 24A to be in fluid communication with the fluid mixture inlet 58 of the third separation module 24B, thereby to engage all of the separation modules 24 sequentially in the separation process. It will also be evident that selective repositioning of the selector means 184 in the parallel configuration 184B thereof (not shown) and of the second fluid switch 200 in the open position 200C thereof (not shown) will cause the centrifugal pump 22 to feed the fluid mixture 44 to the fluid mixture inlet 58 of all three of the separation modules 24,24A and 24B for contemporaneous parallel separation of the fluid mixture 44 in each of said separation modules 24,24A,24B. The precise manner of construction of such a selector means 184 is known to those skilled in the art of constructing fluid transmission devices. The inclusion of the triple-acting switches 186, 200 and 190 is advantageous, in that same enables the ready isolation of any of the separation modules 24 for repair, by selective positioning of the applicable fluid switch 186, 200, 190 in the closed position thereof when the selector means 184 is in the parallel configuration thereof, and in the series bypass position thereof when the selector 184 means is in the series configuration thereof.

It will also be seen in the figures that the separation modules 24, 24A, 24B of the preferred embodiment separation system 20 are each preferably mounted on a carriage means 204 positioned under each of the separation modules 24, 24A, 24B. Each carriage means 204 has four rollers, in the form of wheels 202, depending downwardly from the carriage means 204 for rolling contact with a floor surface 206 located below each separation module. This arrangement facilitates quick and easy movement of each separation module 24, 24A, 24B (without cranes etc., as with the prior art) relative to the floor surface 206 during assembly of the separation apparatus 20 and during maintenance of the separation modules 24, 24A, 24B. Thus, on the relatively infrequent occasions when there is an operational performance problem not addressable by the adjustable tightening of the top plate 90, as discussed above, it is only necessary to shutdown the particular separation module experiencing the problem by isolating that separation module from the system 20 by appropriate manipulation of the selector means 184 and the plurality of triple-acting fluid switches 186, 200, 190. The malfunctioning separation module can thereafter be quickly and easily disconnected from its connected configuration (as shown in FIG. 1), and wheeled away on the carriage means 204 to a service area. Immediate replacement of the defective separation module by a substantially identical back-up separation module (not shown) wheeled into place allows the entire system 20 to be back online in very short order. Unlike prior art separation systems, it is not necessary to shut down the entire separation system 20; rather, only the defective separation module is removed from service. Moreover, the defective separation module can then be readily wheeled to a repair area for efficient servicing at a workbench (as opposed to in situ repair in the prior art) to be returned on its carriage means 204 to serve as a back-up unit, when required. Moreover, In view of the modular nature of the separation modules 204 and their consequential relatively small size, disassembly of the housing 188 and servicing of the components positioned therein is easily accomplished without the need for heavy duty cranes or other lifting devices.

While but a specific embodiment of the present invention is herein shown and described, it will be understood that various changes in size and shape or parts and other modifications and alterations may be used in the design and manufacture of the present invention without departing from the spirit and scope of the invention, which is limited only by the accompanying claims. For example, the outer sidewall 166 of both the feed distributors 160 and the retentate receivers 162 can be of square, rectangular or other regular polygonal plan outline, rather than the circular plan outline shown in the Figures.

We claim:
1. An apparatus for the separation of a fluid mixture into a permeate and a retentate, said separation apparatus comprising:
a separation module defining a substantially horizontal primary axis, a substantially vertical fluid inlet axis and a fluid outlet axis parallel to said fluid inlet axis and spaced apart therefrom along the primary axis, said separation module comprising:
a fluid mixture inlet;
a retentate outlet;
a permeate outlet;
a plurality of pairs of substantially planar, horizontally extending fluid separation membranes, with each pair of separation membranes comprising a first fluid separation membrane and a second fluid separation membrane with each fluid separation membrane having an active surface and an oppositely facing secondary surface, with said active surfaces facing one another;
an equal plurality of fluid containment gaskets interposed one each between each pair of fluid separation membranes in sealing engagement with the active surfaces of both membranes of the respective pair so as to form, in combination with the first and second fluid separation membranes of the respective pair, an equal plurality of fluid containment chambers, with the first fluid separation membrane of each pair forming a lower end of the respective fluid containment chamber and the second fluid separation membrane of each pair forming an upper end of the respective fluid containment chamber, said fluid containment gaskets each having, respectively, an inlet wall normal to the primary axis and adjacent to the outlet axis, an outlet wall, adjacent to the outlet axis, substantially parallel to the inlet wall and spaced therefrom along the primary axis, and two opposed sidewalls extending between said inlet wall and said outlet wall in substantially parallel relation to said primary axis, each of said fluid containment chambers also having a respective inlet area thereof adjacent the inlet wall thereof and a respective outlet area adjacent the outlet wall thereof;
a second plurality of substantially planar, horizontally extending membrane support plates comprising one or more first membrane support plates and one or more second membrane support plates, with said first membrane support plates being vertically spaced from the second membrane support plates, and with each membrane support plate having a central body portion, a substantially quadrilateral outer perimeter portion having one or more lateral edge portions, said central body portion further having an upper surface, a lower surface and each of said membrane support plates further having defined therethrough a plurality of elongate horizontal channels, each elongate channel extending between the central body portion of the respective membrane support plate to a terminus of said each elongate channel located in one or more of said lateral edge portions of the respective membrane support plate;
said plurality of fluid containment chambers being disposed in vertically-stacked relation within said separation module, with said membrane support plates being interleaved one each in alternating order between said fluid containment chambers, with each of said first separation membranes being positioned in adjacent overlying relation to the upper surface of the central body portion of each first membrane support plate and with the secondary surface of each second separation membrane being positioned in the separation module in adjacent underlying relation to the lower surface of the central body portion of each second membrane support plate, such that the termini of the elongate channels extend laterally beyond the lateral extent of the fluid containment chambers;

with each of said membrane support plates being oversized relative to said first and second separation membranes and to said fluid containment gaskets, such that each of said lateral edge portions of the membrane support plates extend laterally beyond adjacent ones of said fluid containment chambers, thereby to expose said termini contained therein to ambient atmosphere external to said fluid containment chambers;

a fluid delivery means for egress of the fluid mixture from the fluid mixture inlet into the inlet area of each of said fluid containment chambers; a permeate collecting means for collection of the permeate from the terminus of each of said plurality of elongate channels for delivery to the permeate outlet;

a retentate collection means for collection of the retentate from the outlet area of each of the fluid containment chambers for delivery to the retentate outlet; and a feeding means for selectively feeding the fluid mixture to the fluid mixture inlet of said separation module.

2. An apparatus according to claim 1, further comprising a means for the creation of a negative pressure differential between the fluid containment chambers and the elongate channels, said negative pressure differential assisting permeation of the permeate across the first and second fluid separation membranes from each fluid containment chamber into the elongate channels of the central body portions of the first and second membrane support plates, for subsequent collection by the permeate collecting means from the termini of said plurality of elongate channels for delivery to the permeate outlet.

3. An apparatus according to claim 1, wherein the fluid delivery means comprises a feed distributor positioned within each of said fluid containment chambers adjacent the respective inlet area thereof, said feed distributor having a substantially cylindrical inner bore substantially centred about the fluid inlet axis; a substantially cylindrical outer sidewall concentrically spaced from said inner bore; a substantially horizontal, planar, annular upper surface extending between said inner bore and said outer sidewall; a substantially horizontal planar, annular lower surface, spaced apart from said annular upper surface along said fluid inlet axis and extending between said inner bore and said outer sidewall; and a plurality of fluid transmission channels radially extending between said inner bore and said outer sidewall substantially towards the respective outlet wall of said each fluid containment chamber.

4. An apparatus according to claim 3, wherein the retentate collection means comprises a retentate receiver positioned within each of said fluid containment chambers adjacent the respective outlet area thereof, said retentate receiver having a substantially cylindrical inner bore substantially centred about the fluid outlet axis; a substantially cylindrical outer sidewall concentrically spaced from said inner bore; a substantially horizontal, planar, annular upper surface extending between said inner bore and said outer sidewall; a substantially horizontal, planar, annular lower surface spaced apart from said annular upper surface along said fluid outlet axis and extending between said inner bore and said outer sidewall; and a plurality of fluid transmission channels radially extending between said inner bore and said outer sidewall substantially towards the respective outlet wall of said each fluid containment chamber.

5. An apparatus according to claim 4, wherein the fluid delivery means further comprises a fluid inlet port in each fluid separation membrane, passing therethrough and centred about the fluid inlet axis, and wherein the retentate collection means further comprises a fluid outlet port in each separation membrane, passing therethrough and centred about the fluid outlet axis.

6. An apparatus according to claim 5, wherein the fluid outlet port of each second fluid separation membrane is sealed to the annular upper surface of a respective one of the retentate receivers; wherein the fluid inlet port of each second fluid separation membrane is sealed to the annular upper surface of a respective one of the feed distributors; wherein the fluid outlet port of each of the first fluid separation membranes is sealed to the annular lower surface of a respective one of the retentate receivers; and wherein the fluid inlet port of each of the first fluid separation membranes is sealed to the annular lower surface of a respective one of the feed distributors.

7. An apparatus according to claim 6, wherein the elongate channels in said membrane support plates are aligned substantially normal to the primary axis.

8. An apparatus according to claim 7, wherein two opposed lateral edge portions are provided on each membrane support plate, positioned one each on opposite sides of said primary axis in substantially parallel relation to said primary axis, and wherein the termini of said elongate channels are positioned in said two lateral edge portions in staggered alternating relation.

9. An apparatus according to claim 8, wherein the fluid delivery means further comprises a fluid inlet port in each membrane support plate, passing therethrough between the upper surface and the lower surface of the central body portion thereof and centred about the fluid inlet axis, and the retentate collection means further comprises a fluid outlet port in each membrane support plate, passing therethrough between the upper surface and the lower surface of the central body portion thereof and centred about the fluid outlet axis.

10. An apparatus according to claim 9, wherein the separation module further comprises an equal plurality of pairs of membrane spacer gaskets with each such pair of membrane spacer gaskets having a first membrane spacer gasket and a second membrane spacer gasket, each of said first membrane spacer gaskets being disposed between a respective first fluid separation membrane and a respective first membrane support plate so as to hold said respective first fluid separation membrane in spaced relation from said first respective membrane support plate, and wherein each of said second membrane spacer gaskets is disposed between a respective second fluid separation membrane and a respective second membrane support plate to hold said respective second fluid separation membrane in spaced relation from said respective second membrane support plate.

11. An apparatus according to claim 10, wherein the separation module further comprises a second plurality of pairs of spacer meshes with one of the spacer meshes of each pair of spacer meshes being held in contacted relation against the lower surface of the central body portion of each of said membrane supporting plates by a respective one of the second spacer gaskets and with the other one of the spacer meshes of said each pair of spacer meshes being held in contacted relation against the upper surface of the central body portion of each of said membrane supporting plates by a respective one of the first spacer gaskets.

12. An apparatus according to claim 11, wherein the fluid inlet port of each of the first fluid separation membranes is sealed to the fluid inlet port of the respective membrane support plate having the upper surface adjacent to which said each first fluid separation membrane is positioned; wherein the fluid inlet port of each second fluid separation membrane is sealed to the fluid inlet port of the respective membrane support plate having the lower surface adjacent to which said each second fluid separation membrane is positioned; wherein the fluid outlet port of each first fluid separation membrane is sealed to the fluid outlet port of the respective membrane support plate having the upper surface adjacent to which said first fluid separation membrane is positioned; and wherein the fluid outlet port of each second fluid separation membrane is sealed to the fluid outlet port of the respective membrane support plate having the lower surface adjacent to which said second fluid separation membrane is positioned.

13. An apparatus according to claim 12, wherein the permeate collecting means comprises a shroud member sealingly extending between a base plate and a top plate to form, in combination with said base plate and said top plate, a housing for the membrane support plates, the fluid separation membranes, the spacer meshes, the membrane spacer gaskets, the fluid containment gaskets, the retentate receivers and the feed distributors.

14. An apparatus according to claim 13, wherein the fluid delivery means further comprises a fluid inlet port passing vertically through the base plate, in centred relation about the fluid inlet axis, and in sealed fluid communication with the inner bore of the feed distributor positioned within a lowermost one of the fluid containment gaskets.

15. An apparatus according to claim 14, wherein the retentate collection means further comprises a fluid outlet port passing vertically through the top plate, centred about the fluid outlet axis and in sealed fluid communication with the inner bore of the retentate receiver positioned within said uppermost of said fluid containment chamber.

16. An apparatus according to claim 15, wherein the means for the creation of a pressure differential between each of the fluid containment chambers and the elongate channels comprises a vacuum pump in fluid communication with said permeate outlet port.

17. An apparatus according to claim 16, further comprising holding means for immobilizing said membrane support plates, said base plate, said top plate, said fluid separation membranes, said spacer meshes, said membrane spacer gaskets, said fluid containment gaskets, said retentate receivers and said feed distributors in close proximity to one another.

18. An apparatus according to claim 17, wherein the holding means comprises a third plurality of threaded rods rigidly connected to the base plate and extending upwardly therefrom within the shroud member and thence through a corresponding third plurality of bores in the top plate; and a corresponding third plurality of nuts adjustably, releasably connected to the threaded rods above the top plate.

19. An apparatus according to claim 16, wherein each of said nuts is a dome nut having an integral o-ring seal partially projecting from a bottom face thereof for sealing contact with said top plate around a respective one of said third plurality of threaded rods.

20. An apparatus according to claim 19, wherein said shroud member comprises a bellows portion which is vertically collapsable upon downward movement of said top plate and which is vertically expandable upon upward movement of said top plate.

21. An apparatus according to claim 20, wherein three or more rollers project downwardly from the bottom of each separation module for rolling contact with a floor surface positioned below said separation module so as to provide for movement of said separation module relative to said floor surface during assembly of said separation apparatus and maintenance of each said separation module.

22. An apparatus according to claim 21, wherein said three or more rollers are mounted on a carriage means positioned under each said separation module.

* * * * *